United States Patent [19]

MacNeill et al.

[11] 4,362,758
[45] Dec. 7, 1982

[54] PROCESS FOR PRODUCING A LOW-CALORIE SPREAD

[75] Inventors: Avril B. MacNeill, Gravesend; Neil G. Hargreaves, Billericay, both of England

[73] Assignee: Lever Brothers Company, New York, N.Y.

[21] Appl. No.: 305,573

[22] Filed: Sep. 25, 1981

[30] Foreign Application Priority Data

Sep. 30, 1980 [GB] United Kingdom ............... 8031552

[51] Int. Cl.³ ............................................. A23D 3/02
[52] U.S. Cl. .................................... 426/603; 426/604
[58] Field of Search ............................... 426/603, 604

[56] References Cited

U.S. PATENT DOCUMENTS

| Re. 30,086 | 8/1979 | Carlile et al. | 426/603 |
|---|---|---|---|
| 904,231 | 11/1908 | Schou | 426/603 |
| 1,958,975 | 5/1934 | Reynolds et al. | 426/603 |
| 2,143,651 | 1/1939 | Fisher et al. | 426/603 X |
| 2,973,269 | 2/1961 | Melnick | 426/603 |
| 3,266,904 | 8/1966 | Duin et al. | 426/604 |
| 3,922,376 | 11/1975 | Strinning et al. | 426/603 |
| 4,115,598 | 9/1978 | Moran | 426/604 |

*Primary Examiner*—Robert A. Yoncoskie
*Attorney, Agent, or Firm*—James J. Farrell

[57] ABSTRACT

A process for producing a low-calorie spread which comprises
(1) proportioning a liquid fat phase and a proteinaceous, gelled aqueous phase into a rotating container in which conditions prevail which promote the formation of an oil-in-water emulsion;
(2) cooling and working the o/w emulsion thus obtained in at least one surface-scraped heat exchanger to achieve crystallization of at least part of the fat;
(3) feeding the emulsion thus obtained into a rotating container under conditions conducive to substantially complete phase inversion.

10 Claims, No Drawings

PROCESS FOR PRODUCING A LOW-CALORIE SPREAD

The invention relates to a process for producing a low-calorie spread. By low-calorie spread is meant throughout the specification in a water-in-oil emulsion having a fat content which is lower than the fat content of conventional margarine, which is approximately 84%. The fat content of the low-calorie spread produced according to the invention preferably ranges from 25-65% and ideally from 30-50%.

Low-calorie spreads can be produced starting from an aqueous phase and a fat phase by first preparing an o/w emulsion and subsequently effecting a phase inversion of the o/w emulsion in scraped-surface heat exchangers in which the emulsion is cooled and worked to obtain an emulsion of the w/o type.

The degree of working and cooling of the emulsions must be carefully adapted to the properties of the fat blend as otherwise phase inversion is incomplete or is not obtained at all. Moreover, part of the emulsion often has to be reworked owing to, for instance, break-down of the packaging machine. This rework involves reheating the product and recirculating the emulsion into the system. In view of the complexity of the composition of the aqueous phase, which often contains proteins and other viscosity controlling agents, such as hydrocolloids, and the complexity of and variations in the fat blend, process control is difficult. It is difficult to predict the type of emulsion (o/w or w/o) at each stage of the process; consequently reproducibility is sometimes difficult to achieve.

Applicants have found a process which alleviates the above disadvantage to a large extent. The process according to the invention for producing a water-in-oil emulsion, particularly a low-calorie spread, comprises:

(i) producing an oil-in-water emulsion by proportioning (a) a liquid fat phase comprising a plastic fat blend of a hardness not exceeding 3,000 g/cm$^2$ which constitutes less than 65 wt.% of the total emulsion, and (b) a gelled aqueous phase containing at least 0.01 wt.% protein, which displays a sharp decrease in gel strength at a temperature preferably ranging from 45° to 70° C.

into a container which rotates at a speed such that the rotated emulsion emerging from said container is still water-continuous;

(ii) subjecting the oil-in-water emulsion thus obtained to cooling and working in at least one surface-scraped heat exchanger to crystallize at least part of the fat;

(iii) feeding the emulsion obtained in step (ii) into a container which is rotated at a speed conducive to substantially complete phase inversion to obtain a water-in-oil emulsion.

The fat phase comprises a plastic fat blend having a hardness at 5° C., expressed in C-values not exceeding 3000 and preferably ranging from 100 to 1000 g/cm$^2$, measured according to the method described in Journal of American Oil Chemists' Society 36 (1959) pp. 345-348, since too high a value would result in a brittle product. The fat phase may comprise, in addition to the fat blend, emulsifiers, colouring substances and flavours.

The fat phase is heated to a temperature at which it becomes liquid, i.e. to a temperature which for most fat blends will range in general from 30° to 55° C.

The aqueous phase usually contains viscosity increasing agents, such as thickening and/or gelling agents, e.g. hydrocolloids, proteins and may also contain water-soluble colouring substances.

The preferred gelling agents are those which, when dissolved in water result in gels displaying a sharp decrease in gel strength at 45°-70° C., such as carrageenan, xanthum gum and/or locust bean gum.

The aqueous phase may further contain proteins, preferably milk proteins, in a proportion ranging from 0.01 to 5 wt.%, preferably from 0.1 to 2 wt.%, which help to destabilize the final emulsion under palate conditions, salt, such as sodium chloride, and preserving agents, such as lactic acid and potassium sorbate.

The aqueous phase is usually heated to 70°-90° C. to allow proper hydration of the gelling agents and pasteurization. The aqueous phase is then allowed to cool to a temperature which approximately corresponds to the temperature of the liquid fat, i.e. 30°-55° C.

Both the aqueous phase and the fat phase are then brought into a container (pre-crystallizing unit PCU), preferably through a proportioning system and, if necessary, through a heat exchanger. In the (PCU) the emulsion is rotated at medium speed, by which is meant under conditions corresponding to less than about 80×g and preferably from 40-60×g, g being the gravity acceleration, i.e. at 300-450 rpm (for a 90 l container) for a period long enough (in most cases 1-2 minutes will be adequate) to obtain an o/w emulsion. The emulsion leaving the (PCU) is worked and rapidly cooled in a surface-scraped heat exchanger of the votator type, whereby small crystals are formed and the temperature of the emulsion decreases to about 8-14° C.

According to a preferred procedure cooling is performed in two stages. In a first surface-scraped heat exchanger the emulsion is allowed to cool to 8°-14° C., preferably 10°-12° C., and in a second stage the emulsion is allowed to cool to a temperature ranging from 0°-8° C., preferably 2°-7° C. The residence time in both surface-scraped heat exchangers is preferably 5-15 seconds. The partially crystallized emulsion is then pumped to a variable-speed (post)-crystallizing unit, where it is rotated at relatively high speed, by which is meant under conditions corresponding to more than 80×g, and preferably from 90-110×g, e.g. 500-700 rpm for a container of about 96 liters, to achieve phase inversion and obtain a w/o emulsion. During this treatment the temperature of the emulsion will rise to about 10°-15° C.

According to a preferred embodiment of the present invention (post)-crystallization is achieved in two stages. The first stage involves a treatment as outlined above. The second stage involves a further treatment in a second variable-speed (post)-crystallizing unit, where the emulsion is rotated at relatively low speed (5-10×g), viz. 100-200 rpm for a container of about 96 liters and the temperature of the emulsion is roughly the same as the temperature of the emulsion leaving the first variable-speed (post)-crystallizing unit. A residence time in the (post)-crystallizing unit(s) of preferably 1-2 minutes will be adequate in most instances. This treatment does not affect the nature of the emulsion which remains oil-continuous.

In order to obtain a product having the desired texture and plasticity, it is sometimes advantageous to keep the final emulsion in resting tubes, wherein the emulsion, if desired, can be subjected to some working before it is packed. During its storage in the resting tubes, the temperature of the emulsion will generally rise to 12°–20° C.

In case of a break-down of the packaging machine or in case the operator has indications that the product is deteriorated, the emulsion can be reworked by heating it to a temperature above its melting point, generally at approximately 55°–65° C., pumping it through a heat exchanger where it is allowed to cool to preferably about 30°–40° C., to the pre-crystallizing unit described above. Under the conditions prevailing in the pre-crystallizing unit as outlined above, an o/w emulsion is reproducibly obtained.

A great number of experiments performed with emulsions having a relatively low fat content, produced by the process outlined above according to the invention, have indicated that the problems associated with the existing uncertainty with regard to the type of emulsion (o/w or w/o) obtained on mixing the fat and water phases or on re-working, have been solved. The process of the present invention thus allows a better control and an improved reproducibility at all stages.

The invention will now be illustrated in the following Example.

EXAMPLE

A fat-continuous low-calorie spread was produced from the following ingredients:

|  | wt. % |
|---|---|
| Fat phase | |
| Plastic fat blend (C = 450 g/cm$^2$) | 35 |
| Monoglyceride | 0.2 |
| Colouring substance | 0.015 |
| Flavour | 0.016 |
| Aqueous phase (pH 4.6) | |
| Whey solids | 0.6 |
| Potassium sorbate | 0.1 |
| Carrageenan | 0.2 |
| Locust bean gum | 0.08 |
| Lactic acid | 0.05 |
| Water | up to 100 |

The fat phase, comprising a fat blend consisting of:
60 parts sunflower oil,
10 parts hyrogenated soybean oil, and
30 parts coconut oil,
was heated to 45° C. The water phase heated to 50° C.

Both phases were brought through a proportioning pump into a pre-crystallizing unit of about 90 liters, operating at 370 rpm. The residence time in this unit was about 92 seconds. At the end of the run an o/w emulsion was obtained.

The o/w emulsion was chilled to about 10° C. in an ammonia-cooled surface-scraped unit. The residence time in this unit was about 18 seconds.

The partially crystallized emulsion emerging from this unit was further pumped to a variable-speed crystallizing unit of 96 liters, rotating at 600 rpm. After about 100 seconds a w/o emulsion was obtained.

Crystallization was allowed to proceed for about 100 seconds at 150 rpm, whereby the temperature of the emulsion gradually rose to about 12° C. and possible small traces of water, which remained unemulsified after the first treatment at 600 rpm, were dispersed in the emulsion.

A product of the desired plasticity and texture was obtained after allowing the emulsion to rest for a short period in a resting unit.

Rework was achieved by remelting the product at 60° C., pumping it through a heat exchanger, where it was cooled to 35° C., and hereafter introduced into the pre-crystallizing unit for further processing.

We claim:

1. A process for producing a low-calorie food spread comprising
    (i) producing an oil-in-water emulsion by proportioning
        (a) a liquid fat phase comprising a plastic fat blend of a hardness not exceeding 3,000 g/cm$^2$ at 5° C. which constitutes less than 65 wt.% of the total emulsion, and
        (b) a gelled aqueous phase containing at least 0.01 wt.% protein,
        into a container which rotates at a speed such that the rotated emulsion emerging from said container is water-continuous;
    (ii) subjecting the oil-in-water emulsion thus obtained to cooling and working in at least one surface-scraped heat exchanger to crystallize at least part of the fat;
    (iii) feeding the emulsion obtained in step (ii) into a container which is rotated at a speed conducive to substantially complete phase inversion to obtain a water-in-oil emulsion.

2. A process according to claim 1, in which the liquid fat phase has been obtained by heating the fat to a temperature ranging from 35° to 55° C.

3. A process according to claim 1, in which the aqueous phase is first heated to a temperature allowing hydration of the gelling agent and pasteurization and then cooled to a temperature which approximately corresponds to the temperature of the liquid fat.

4. A process according to claim 1, in which a fat blend having a hardness at 5° C. ranging from 100–1,000 g/cm$^2$ is used.

5. A process according to claim 1, in which the gelled aqueous phase displays a sharp decrease in gel strength at a temperature ranging from 45° to 70° C.

6. A process according to claim 1, in which the fat blend constitutes 30–50 wt.% of the total emulsion.

7. A process according to claim 1, in which the protein level ranges from 0.1 to 2 wt.%.

8. A process according to claim 1, in which step (ii) is carried out in two stages, using two surface-scraped heat exchangers whereby the emulsion emerging from said first heat exchanger has a temperature ranging from 8°–14° C. and said emulsion after having been worked in the second heat exchanger has a temperature ranging from 0° to 8° C.

9. A process according to claim 1, further comprising feeding the water-in-oil emulsion obtained in step (iii) into a container which is rotated at a relatively low speed which does not affect the nature of the emulsion, to allow post-crystallization to proceed and obtain a spread of the desired plasticity and texture.

10. A process according to claim 1, wherein part of the final product is recirculated by heating it to a temperature above its melting point and feeding it via a heat exchanger to the rotating container of step (i).

* * * * *